Jan. 10, 1956 B. STEVERLYNCK Re. 24,109
APPARATUS FOR THE TREATMENT OF TEXTILE MATERIALS AT ELEVATED TEMPERATURES
Original Filed Sept. 30, 1949
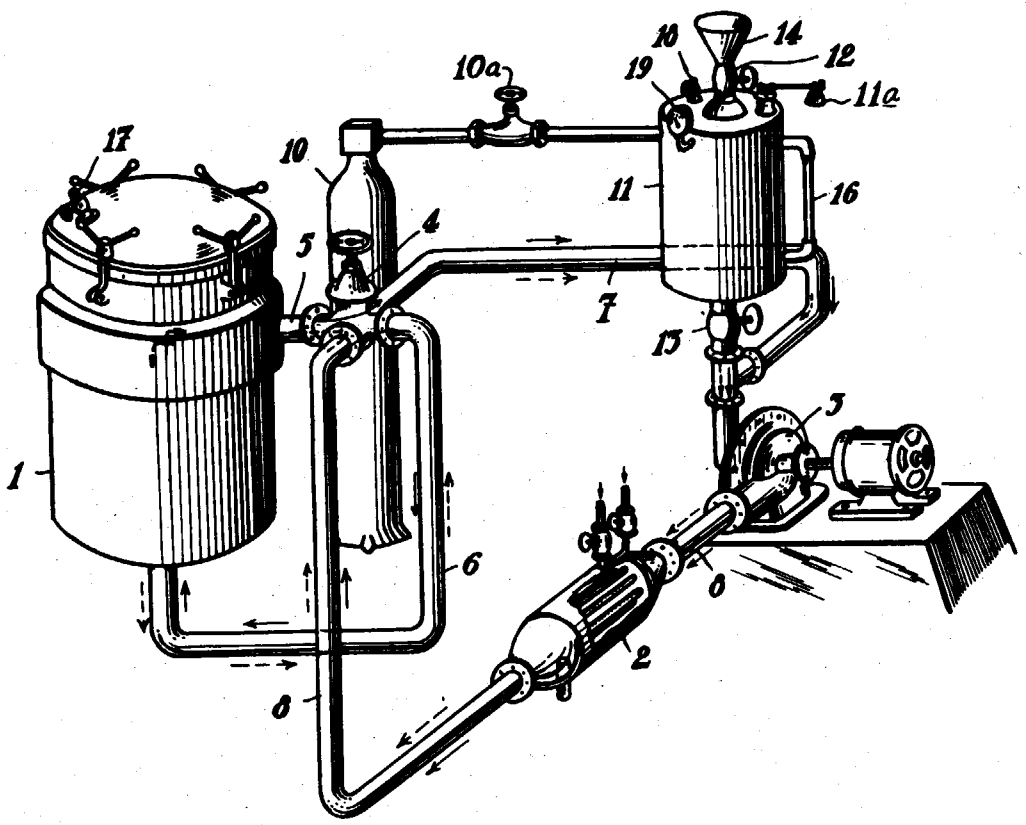
Baldewijn Steverlynck,
INVENTOR
PER: Richards & Geier
ATTORNEYS United States Patent Office Re. 24,109
Reissued Jan. 10, 1956

24,109

APPARATUS FOR THE TREATMENT OF TEXTILE MATERIALS AT ELEVATED TEMPERATURES

Baldewijn Steverlynck, Courtrai, Belgium, assignor to Groeninghe Ververij P. V. B. A., Courtrai, Belgium Original No. 2,633,009, dated March 31, 1953, Serial No. 118,842, September 30, 1949. Application for reissue December 8, 1954, Serial No. 474,046. In the Netherlands February 10, 1949

10 Claims. (Cl. 68—184)

Matter enclosed in heavy brackets [ ] appears in the original patent but forms no part of this reissue specification; matter printed in italics indicates the additions made by reissue.

The present invention relates to a machine for the treatment of textile materials (dyeing, bleaching, impregnating, sizing, etc.) in over-pressurized closed apparatus.

The dyeing machines actually on the market present two major drawbacks, inherent [to] *in* their design.

The circulation in the dye baths depends on a centrifugal pump or a pump of a different type, so that the material to be dyed is necessarily compressed by the pressure of the liquor. It will be easily understood that the higher the circulation pressure, the more the material will be compressed and the more difficult will be the circulation of the dye baths.

On the other hand, most dyeings are effected at a temperature approaching the boiling point. It is, however, generally admitted that the output of centrifugal pumps is greatly reduced when the dye baths near the boiling temperature. As a consequence, the circulation in boiling dye baths is considerably reduced, with the result of extending the duration of the dyeing.

These two drawbacks are totally eliminated by the new machine which constitutes the subject matter of the present invention.

The new apparatus allows an abatement to 50% of the pressure and output of the pumps of the machines and results in a considerable saving of time required for the dyeing. The dyeing material is never distorted, be it material in raw stock or on *cops* [tops], packages, beams, cakes, or the like, and it remains soft, thus favoring the penetration of the dye baths to a remarkable extent and allowing a considerable reduction of time for the dyeing operation. Furthermore, the use of the lowest possible pump pressure tends to inhibit the formation of channels through which the liquor would pass without penetrating the dyeing material properly.

This achievement is attained in a very simple manner, merely by applying a constant over-pressure during the dyeing operation by means of a balance tank which is preferably connected to the suction side of the pump. This over-pressure is provided either by expanding the dye bath through heating or by introducing a compressed gas [into] *to provide a resilient gas cushion in* the upper part of the balance tank.

This tank is provided with a water level *gauge* for [permanent] *continuous* control of *the liquid level of* its contents and also has on its top portion a valve, with a funnel located above the valve and through which dyestuffs and other substances may [eventually] be fed to the tank while dyeing is in progress.

The balance tank which is always half empty prevents disruption of the machine and, through its cushion of compressed air, it exercises an elastic pressure on the suction side of the pump, thus reducing formation of vapor. This improves the output of the circulation pump, as compared with prior art atmospheric dyeing machines, in an extraordinary way even when approaching the boiling temperature. As the circuit is completely closed, temperatures of 110° C. and higher are easily reached without disturbing the proper operation of the pump, the pipes or other parts of the machine, for the pressure resulting from the rise in temperature prevents boiling of the dye bath. Moreover, any unwanted intake of air through the packing on the suction side of the pump is avoided by the effect of the overpressure.

Dyestuffs and other substances may be easily added to the dye bath by closing the lower valve of the balance tank, without stopping the circulation or having to drop the machine pressure.

The possibility of heating dye baths at temperatures over 100° C. allows, in most cases, to obtain a dispersion of the dyestuffs in a very short time and in a proportion never before attained. It also makes possible the dyeing of the newest synthetic fibres to a high degree of fastness.

A heat exchanger connected to the [feed] *outlet* side of the pump is used for heating of the dye baths. This exchanger has been so designed as to serve eventually to cool off the baths by means of cold water circulation, thus providing for the dyer the possibility of varying the temperature of the dye baths during the dyeing operation as he deems it necessary. In that case compressed air or gas may be fed to the upper part of the balance tank in order to make it possible to keep the machine under static pressure while dyeing is in progress.

The result of dyeing under overpressure or at high temperature is a perfect penetration of the dyeing materials, even of the most refractory ones, and an excellent levelling on delicate materials, such as cakes of rayon of the finest denier, mercerized cotton on packages, spun staples, beams, yarn or hanks, etc., within a very short time.

The essential characteristics of the improved machine which is the object of the present invention will be more clearly explained, by way of example only, in the following description.

In the accompanying drawing the machine has been diagrammatically illustrated in perspective view.

The machine as illustrated is in part known but has certain devices that make it possible to bring the textile masses in the dye vat under a static pressure.

The machine includes a dye vat 1 which is generally in use in the dyeing industry, a circulation pump 3, and a double or four-way valve 4, the latter being connected through pipes 5 and 6 to vat 1. A pipe 7 connects the four-way valve 4 and the pump 3 whereas a pipe 8 links the valve 4 with the pump 3, with the heat exchanger 2 between them. The balance tank (expansion vat) 11 *is pressure tight and* may be connected to a [compressor] *high pressure gas bottle* 10 [over] *through* a valve 10a. The balance tank is also connected to the suction side of the pump 3. The inlet and exhaust pipes of the balance tank are provided with valves 12 and 13, respectively, and, to facilitate the addition to the tank of water or active substances, the inlet pipe is provided with a funnel 14. Furthermore, the balance tank is also fitted with a water gauge 16 for the constant control of its contents, a safety valve 11a, a pressure gauge 19 and an air release valve 18.

There is also an air valve 17 on top of the dye vat 1.

In operation, the active substances and the fibres to be subjected to the treatment are introduced into the dye vat 1, and the latter is tightly closed. *The vat 1 constrains the dye liquor to flow in the usual manner through the material to be treated.* The pump 3 is then set in motion, and the liquor circulates through the vat in one *direction* or the other [direction], according to the position of the four-way valve. Then, in order to create a static pressure of 0.5 to 10 *atmospheres* [atm.] in the circulation system and consequently also in the dye vat 1, the balance tank 11 is connected to a suitable pressure source, for example, to a pressure-filled gas bottle 16.

The same balance tank is also used to add active substances or liquid to the circulation system while the dyeing is proceeding. For this purpose the valve 13 is *temporarily* closed and the valve 12 is opened. After the addition of the liquid the valve 12 is closed and the valve 13 is opened again [to] *so* as to allow the contents of the tank 11 to flow into the circulation system. By way of example, pressure gas may be introduced at the top of the tank and at the same time some liquor may be allowed to escape through valve 17. Obviously, other suitable means may be used to attain the same objectives.

The heat exchanger 2 has been provided to warm up or cool off the circulation liquor. It has two valves, one for adding steam and the other for adding cold water.

The directions which the processing liquor is able to follow are indicated *for the two positions of reversing valve 4* by full line and dotted arrows.

What I claim is:

1. An apparatus for treating textile material, and particularly for dyeing such textile material in an aqueous bath at temperatures close to and above 100° C., said apparatus comprising, in combination, a substantially hermetically closed vat, a circulating pump, a double valve, pipes connecting said double valve with the inlet and outlet of said vat, liquid circulating means connecting said double valve with the inlet and outlet of said pump whereby said means and said pipes constitute a closed main circulation circuit between said vat and said pump, a closed balance tank situated outside of said circuit, means upon the top of said balance tank for supplying a liquid thereto, whereby said balance tank also serves as a supply vessel, a pipe connecting the bottom of said balance tank with the first-mentioned means adjacent to the inlet of said pump, a single valve carried by the last mentioned pipe, and means supplying at will compressed gas to the top of said closed balance tank.

2. An apparatus for treating textile material, and particularly for dyeing such textile material in an aqueous bath at temperatures close to and above 100° C., said apparatus comprising, in combination, a substantially hermetically closed vat, a circulating pump, a double valve, pipes connecting said double valve with the inlet and outlet of said vat, liquid circulating means connecting said double valve with the inlet and outlet of said pump and including a heat exchanger located between the outlet of said pump and said double valve, whereby said means and said pipes constitute a closed main circulation circuit between said vat and said pump, a closed balance tank situated outside of said circuit, means upon the top of said balance tank for supplying a liquid thereto, whereby said balance tank also serves as a supply vessel, a pipe connecting the bottom of said balance tank with the first-mentioned means adjacent to the inlet of said pump, a single valve carried by the last-mentioned pipe, and means supplying at will compressed gas to the top of said closed balance tank.

*3. An apparatus for treating textile material and particularly for subjecting such textile material to an aqueous bath at temperatures close to and above 100° C., said apparatus comprising, in combination, a substantially hermetically closed vat, a circulating pump, pipes connecting said pump with the inlet and outlet of said vat to constitute a closed main circulation circuit between said vat and said pump, a closed balance tank situated outside of said circuit, means upon the top of said balance tank for supplying a liquid thereto, whereby said balance tank also serves as a supply vessel, a pipe connecting the bottom of said balance tank with said circuit adjacent to the inlet of said pump, a single valve controlling flow through said last mentioned pipe, and means supplying at will compressed gas to the top of said closed balance tank.*

*4. In a liquid treatment apparatus of the class described, in combination with a closed pressure tight vat adapted to hold therein material to be treated and to constrain a treatment liquor entering said vat to flow through said material, a closed circulatory duct system connected to different portions of said vat which communicate with oppositely disposed portions of said material for conveying said liquor therethrough, and pump means serially included in said duct system for forcing said liquor to flow through said duct system and said vat to constitute a closed main circulation circuit for said liquor extending through said vat, said duct system and said pump, the provision of: a closed pressure tight balance tank situated outside of said circuit; controllable means connected to said balance tank for maintaining said tank partially filled with a liquid and maintaining a resilient cushion of gas under a pressure appreciably higher than atmospheric pressure above the liquid in said partially filled tank; means defining a branch passage interconnecting said circuit and a portion of said balance tank situated beneath the level of the liquid therein, said passage defining means both preventing appreciable circulatory flow of said liquor in said circuit through said balance tank and transmitting to the liquor in said circuit the hydrostatic pressure of said liquid in said balance tank.*

*5. The combination according to claim 4, in which said branch passage is defined by a branch duct connected to said circuit intermediate said vat and the induction side of said pump means.*

*6. The combination according to claim 4, in which said controllable means further comprises: a source of gas under relatively high pressure, duct means connecting said source to said balance tank, and valve means included in said connection from said source to said tank for permitting gas to flow at will from said source to said tank for increasing the pressure of said gas cushion above said liquid.*

*7. The combination according to claim 4, further comprising the provision of controllable valve means included in said passage defining means for temporarily shutting off said branch passage.*

*8. The combination according to claim 4, further comprising controllable inlet means communicating with the interior of said balance tank for introducing any desired soluble substance into said liquid within said tank, whereby said balance tank additionally serves as a supply vessel.*

*9. The combination according to claim 4, further comprising controllable heat exchange means serially included in said circuit for varying the temperature of said liquor.*

*10. The combination according to claim 9, wherein said heat exchange means is adapted to heat said treatment liquor to a temperature which is at least equal to the boiling point thereof and in which said branch passage communicates with a portion of said circuit in proximity to the inlet of said pump means for applying said hydrostatic pressure to the liquor in said circuit which is entering said pump means, thereby tending to prevent the formation of vapor within said pump.*

References Cited in the file of this patent or the original patent

UNITED STATES PATENTS

| | | |
|---|---|---|
| 829,188 | Weiss | Aug. 21, 1906 |
| 898,444 | Detre | Sept. 15, 1908 |
| 1,155,946 | Miller | Oct. 5, 1915 |
| 1,459,697 | Taylor | June 19, 1923 |
| 1,799,421 | Hornbuckle | Apr. 7, 1931 |
| 2,227,926 | Drum | Jan. 7, 1941 |
| 2,409,518 | Smith | Oct. 15, 1946 |
| 2,446,502 | Wehrli | Aug. 3, 1948 |

FOREIGN PATENTS

| | | |
|---|---|---|
| 666,743 | France | May 28, 1929 |